(12) United States Patent
Jachetta

(10) Patent No.: US 9,991,962 B2
(45) Date of Patent: Jun. 5, 2018

(54) STACKABLE FIBER OPTIC TRANSMITTER/RECEIVER MODULES

(71) Applicant: Multidyne Electronics, Inc., Hauppauge, NY (US)

(72) Inventor: Francis P. Jachetta, Oyster Bay, NY (US)

(73) Assignee: Multidyne Electronics, Inc., Hauppauge, NY (US)

( * ) Notice: Subject to any disclaimer, the term of this patent is extended or adjusted under 35 U.S.C. 154(b) by 0 days. days.

(21) Appl. No.: 15/487,824

(22) Filed: Apr. 14, 2017

(65) Prior Publication Data

US 2017/0302382 A1     Oct. 19, 2017

Related U.S. Application Data

(60) Provisional application No. 62/323,211, filed on Apr. 15, 2016, provisional application No. 62/411,921, filed on Oct. 24, 2016.

(51) Int. Cl.
*H04B 10/00* (2013.01)
*H04B 10/43* (2013.01)
*H04B 10/80* (2013.01)

(52) U.S. Cl.
CPC ........... *H04B 10/43* (2013.01); *H04B 10/801* (2013.01)

(58) Field of Classification Search
CPC ...... H04B 10/43; H04B 10/40; H04B 10/801; H04B 10/1143; H04B 10/807; G02B 6/4246; G02B 6/43; G02B 6/4201; G02B 6/4214; G02B 6/4292; G01S 7/4812; G01S 7/4818; H05K 1/0274; H05K 1/117; H05K 1/14; H05K 2201/10121
(Continued)

(56) References Cited

U.S. PATENT DOCUMENTS

| 6,532,155 B2* | 3/2003 | Green | G02B 6/4277 |
| | | | 361/730 |
| 8,265,487 B2* | 9/2012 | Schunk | H04B 10/40 |
| | | | 398/135 |

(Continued)

OTHER PUBLICATIONS

Ogdentec, "XS-3G-HD/SDI: Fiber Optical Transmitter and Receiver," www.ogdentec.com, 2 pages.

*Primary Examiner* — Hibret Woldekidan
(74) *Attorney, Agent, or Firm* — Ryan, Mason & Lewis, LLP

(57) ABSTRACT

An apparatus in one embodiment comprises a first stackable transmitter/receiver module. The first stackable transmitter/receiver module comprises a housing having first and second ends and multiple sides between the first and second ends, a first signal connector arranged at the first end of the housing, a second signal connector arranged at the second end of the housing, and one or more sets of interconnects arranged on respective ones of the sides of the housing. The first stackable transmitter/receiver module is configured for mated stacking with one or more additional stackable transmitter/receiver modules via the one or more sets of interconnects. A given one of the sets of interconnects of the first transmitter/receiver module is configured to mate with a corresponding complementary set of interconnects arranged on a side of a housing of one of the additional stackable transmitter/receiver modules when the first and additional modules are stacked.

20 Claims, 12 Drawing Sheets

(58) Field of Classification Search
USPC ....... 398/117, 116, 135, 138, 139, 140, 141, 398/164
See application file for complete search history.

(56) References Cited

U.S. PATENT DOCUMENTS

| | | | | |
|---|---|---|---|---|
| 8,622,629 | B1 | 1/2014 | Umeno | |
| 8,727,793 | B2* | 5/2014 | Cafiero | G02B 6/4201 |
| | | | | 439/540.1 |
| 2002/0181058 | A1* | 12/2002 | Ger | H04B 10/801 |
| | | | | 398/164 |
| 2004/0017992 | A1 | 1/2004 | Lin et al. | |
| 2009/0011652 | A1 | 1/2009 | Koh | |
| 2011/0110631 | A1* | 5/2011 | Baker | G02B 6/4292 |
| | | | | 385/88 |
| 2012/0045915 | A1* | 2/2012 | Daily | H01R 13/113 |
| | | | | 439/162 |
| 2013/0210244 | A1 | 8/2013 | DiFonzo et al. | |
| 2015/0037038 | A1* | 2/2015 | Takahashi | H04B 10/40 |
| | | | | 398/79 |
| 2015/0093922 | A1 | 4/2015 | Bosscher et al. | |
| 2015/0104199 | A1* | 4/2015 | Ye | G02F 1/0147 |
| | | | | 398/212 |
| 2015/0288455 | A1* | 10/2015 | Legare-Vallee | H04L 25/20 |
| | | | | 398/201 |
| 2016/0011383 | A1* | 1/2016 | Lee | G02B 6/3897 |
| | | | | 385/75 |
| 2016/0209818 | A1* | 7/2016 | Mandle | G05B 15/02 |
| 2017/0075849 | A1* | 3/2017 | Lavoie | G06F 13/4081 |
| 2017/0257146 | A1* | 9/2017 | Szeto | H04B 5/0075 |

* cited by examiner

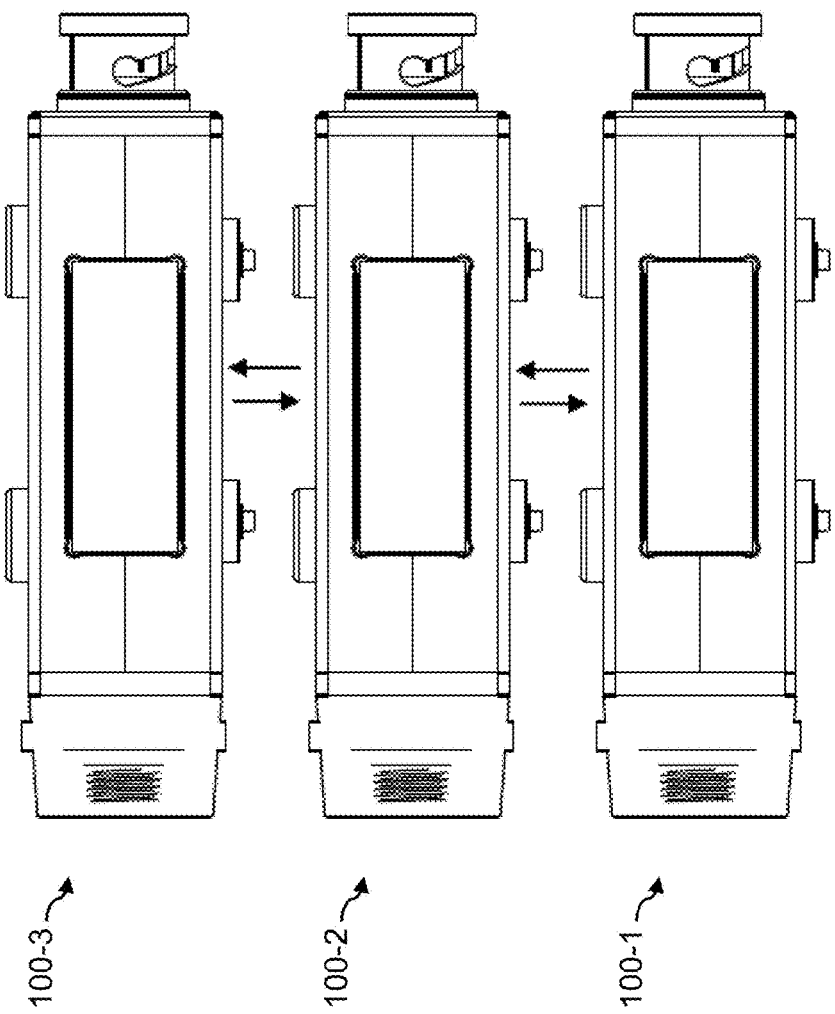

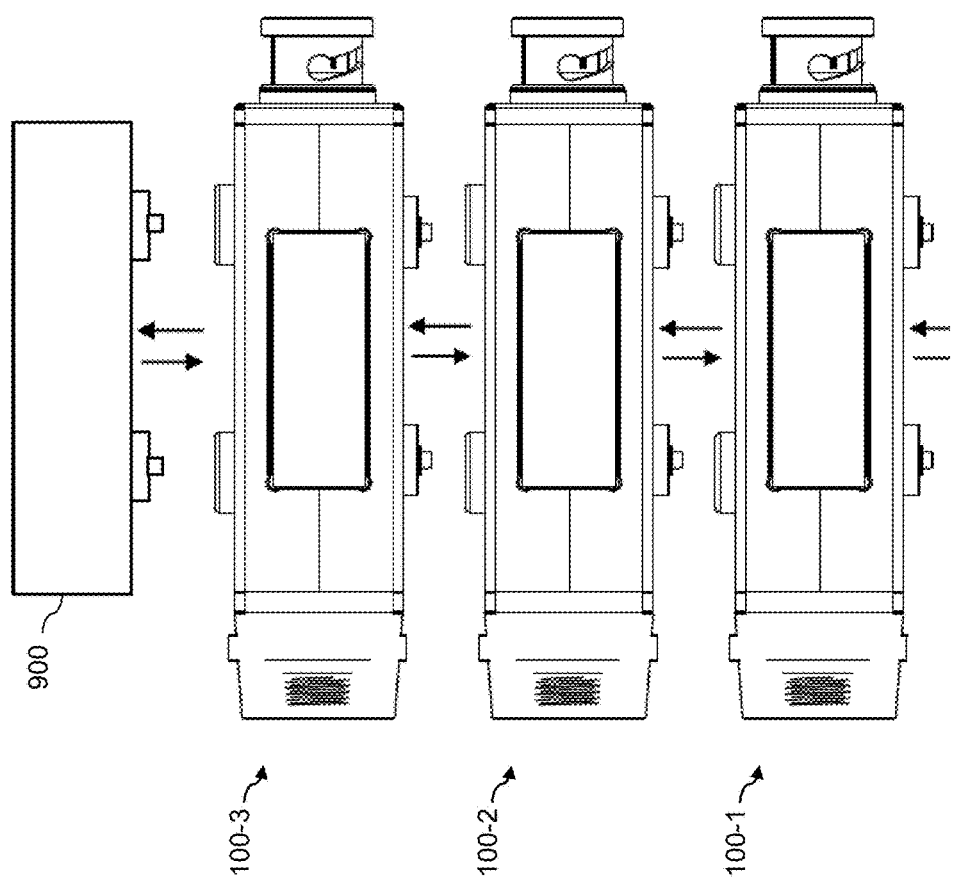

FIG. 17
BACK
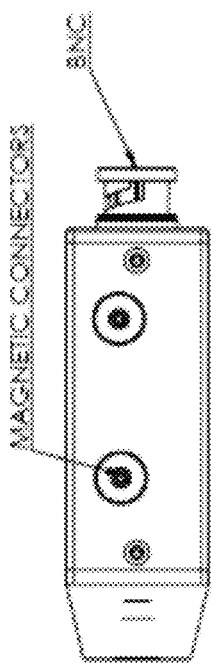
MAGNETIC CONNECTORS
BNC
SIDE FIG. 15
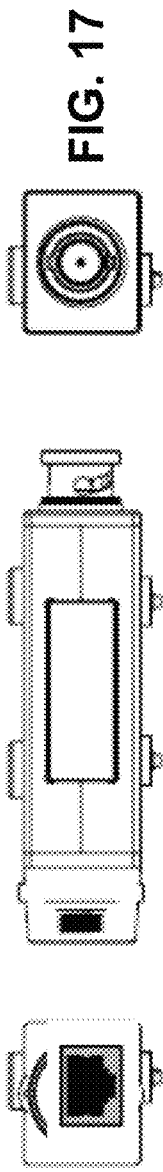
TOP FIG. 14
FRONT
FIG. 16
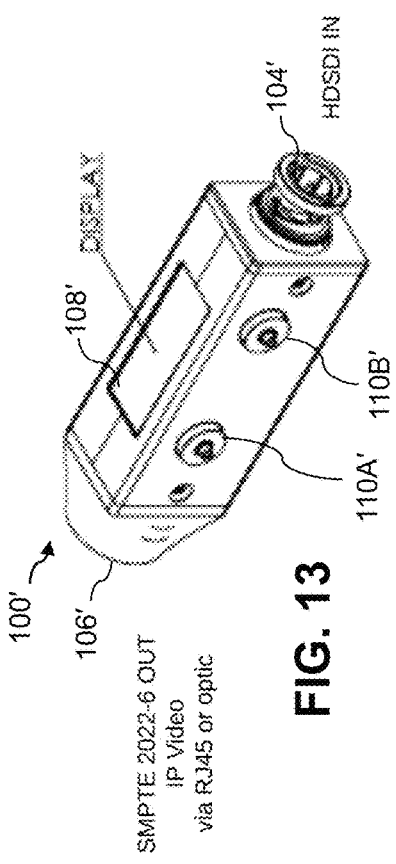
104'
HDSDI IN
108' DISPLAY
110A' 110B'
100'
106'
SMPTE 2022-6 OUT
IP Video
via RJ45 or optic
FIG. 13

# US 9,991,962 B2

STACKABLE FIBER OPTIC TRANSMITTER/RECEIVER MODULES

PRIORITY CLAIM

The present application claims priority to U.S. Provisional Patent Application Ser. No. 62/323,211, filed Apr. 15, 2016 and entitled "Stackable Fiber Optic Transmitter/Receiver Modules," and U.S. Provisional Patent Application Ser. No. 62/411,921, filed Oct. 24, 2016 and entitled "Stackable Fiber Optic Transmitter/Receiver Modules," both of which are incorporated by reference herein in their entirety.

FIELD

The field relates generally to optoelectronic devices, and more particularly to fiber optic transmitters and fiber optic receivers, as well as other types of transmitter/receiver modules not necessarily involving fiber optics.

BACKGROUND

A wide variety of different types of fiber optic transmitters and receivers are known in the art. However, difficulties remain in conventional implementations of such devices. For example, deployment of multiple instances of certain types of devices in a practical fiber optic transport system can be unduly cumbersome. Also, power distribution between the multiple instances of the devices is often problematic.

SUMMARY

Illustrative embodiments of the present invention include stackable fiber optic transmitter/receiver modules, and fiber optic transport systems that incorporate such modules. Such arrangements can advantageously provide significantly more efficient deployment of fiber optic transmission and reception equipment within the field, while also facilitating power distribution between transmitter/receiver modules.

In one embodiment, an apparatus comprises a first stackable transmitter/receiver module. The first stackable transmitter/receiver module comprises a housing having first and second ends and multiple sides between the first and second ends, a first signal connector arranged at the first end of the housing, a second signal connector arranged at the second end of the housing, and one or more sets of interconnects arranged on respective ones of the sides of the housing. The first stackable transmitter/receiver module is configured for mated stacking with one or more additional stackable transmitter/receiver modules via the one or more sets of interconnects. A given one of the one or more sets of interconnects of the first transmitter/receiver module is illustratively configured to mate with a corresponding complementary set of interconnects arranged on a side of a housing of one of the additional stackable transmitter/receiver modules when the first and additional stackable transmitter/receiver modules are disposed in a stacking relationship relative to one another.

By way of example, the first stackable transmitter/receiver module in some embodiments illustratively comprises first and second sets of interconnects arranged on respective opposing first and second ones of the multiple sides, with the first set of interconnects arranged on the first side being complementary to the second set of interconnects arranged on the second side.

In some embodiments, one of the first and second signal connectors of the first stackable transmitter/receiver modules comprises an electrical connector and the other of the first and second signal connectors comprises a fiber optic connector.

Additionally or alternatively, the given set of interconnects arranged on one of the sides of the housing of the first stackable transmitter/receiver module comprises power contacts of a first type configured to electrically connect with respective complementary power contacts of a second type in a complementary set of interconnects on a side of a housing of one of the additional stackable transmitter/receiver modules. In an arrangement of this type, electrical power may be supplied from one of the first and additional stackable transmitter/receiver modules to another of the first and additional stackable transmitter/receiver modules via the power contacts of the first and second types when the first and additional stackable transmitter/receiver modules are disposed in a stacking relationship relative to one another.

BRIEF DESCRIPTION OF THE DRAWINGS

FIG. 8 illustrates stacking of multiple fiber optic transmitter/receiver modules in another embodiment.

FIG. 9 illustrates stacking of multiple fiber optic transmitter/receiver modules with a battery pack in a further embodiment.

FIG. 13 shows a perspective view of a transmitter/receiver module in another illustrative embodiment.

FIGS. 14 through 17 show respective top, side, front end and back end views of the transmitter/receiver module of FIG. 13.

DETAILED DESCRIPTION

Illustrative embodiments of the present invention will be described herein with reference to particular examples of fiber optic transmitter/receiver modules and fiber optic transport systems that incorporate such modules. It is to be appreciated, however, that embodiments of the invention are not restricted to use with the particular illustrative transmitter/receiver module configurations shown. For example, those skilled in the art will recognize that numerous alternative module configurations can be implemented utilizing the teachings provided herein. Also, the modules can be utilized in a wide variety of fiber optic system applications other than those specifically mentioned herein. For example, the disclosed modules are suitable for use in any type of fiber optic system in which it is desirable to provide at least one of fiber optic transmission and reception functionality. Other illustrative embodiments of transmitter/receiver modules in accordance with the invention can include alternative input and output configurations not necessarily involving fiber optics.

Figure 1:
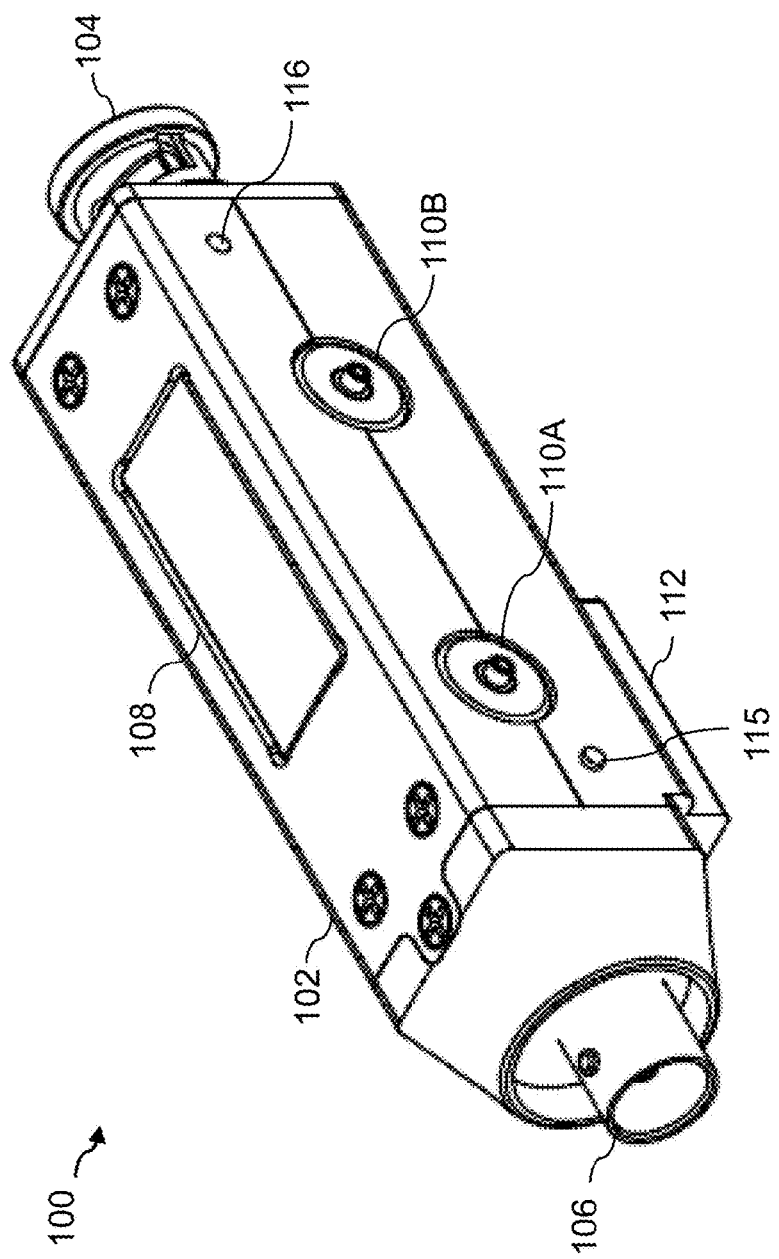
FIG. 1 is a perspective view of a fiber optic transmitter/receiver module in an illustrative embodiment of the invention.
Figure 2:
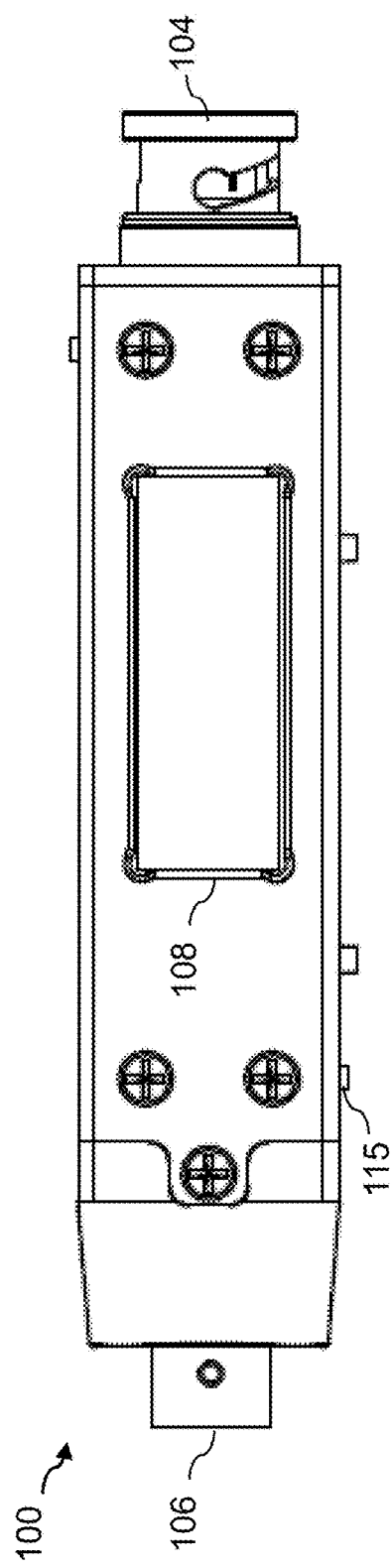
FIGS. 2 and 3 show respective top and bottom views of the fiber optic transmitter/receiver module of FIG. 1.
Figure 3:
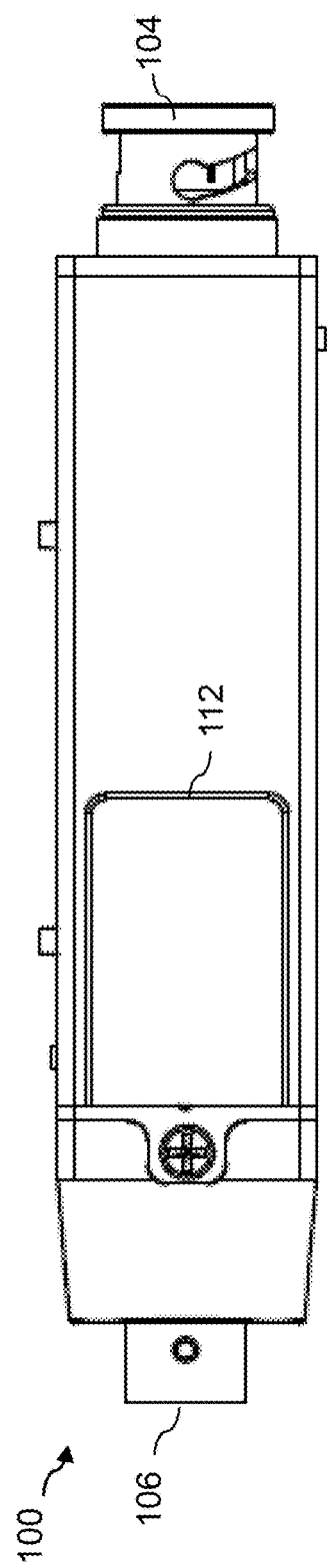
Figure 4:
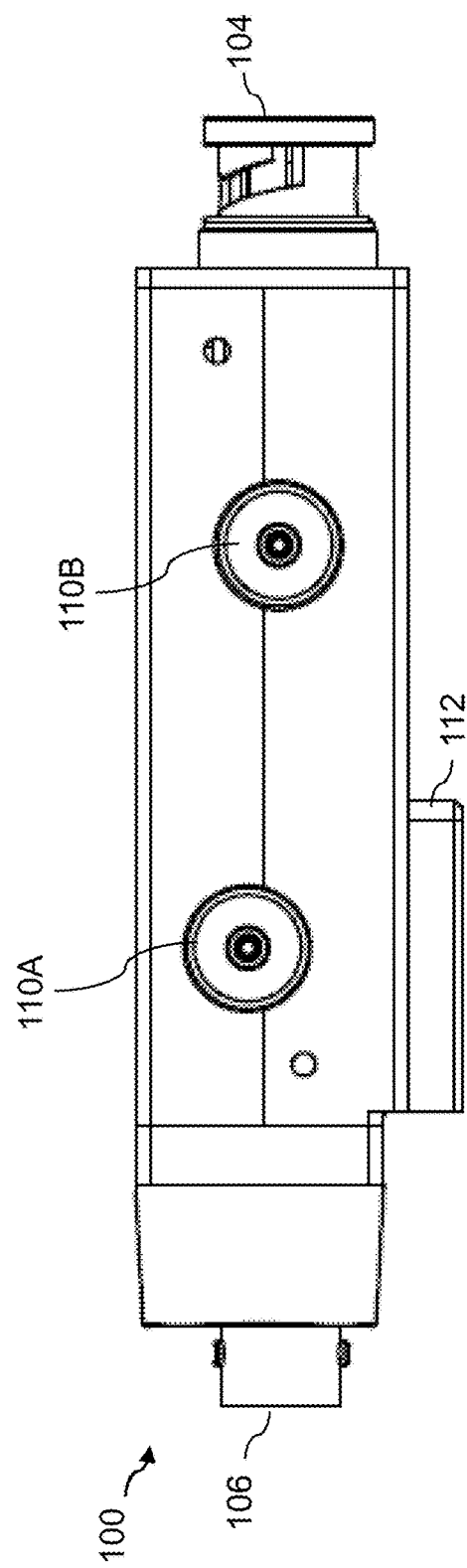
FIGS. 4 and 5 show respective side views of the fiber optic transmitter/receiver module of FIG. 1.

FIG. 1 shows a fiber optic transmitter/receiver module 100 in an illustrative embodiment. The module 100 can be configured as a fiber optic transmitter or as a fiber optic receiver. The module 100 comprises a housing 102, an electrical connector 104, a fiber optic connector 106 and a display 108. The housing 102 is compact at approximately three inches in length, although other dimensions and shapes can be used.

Figure 5:
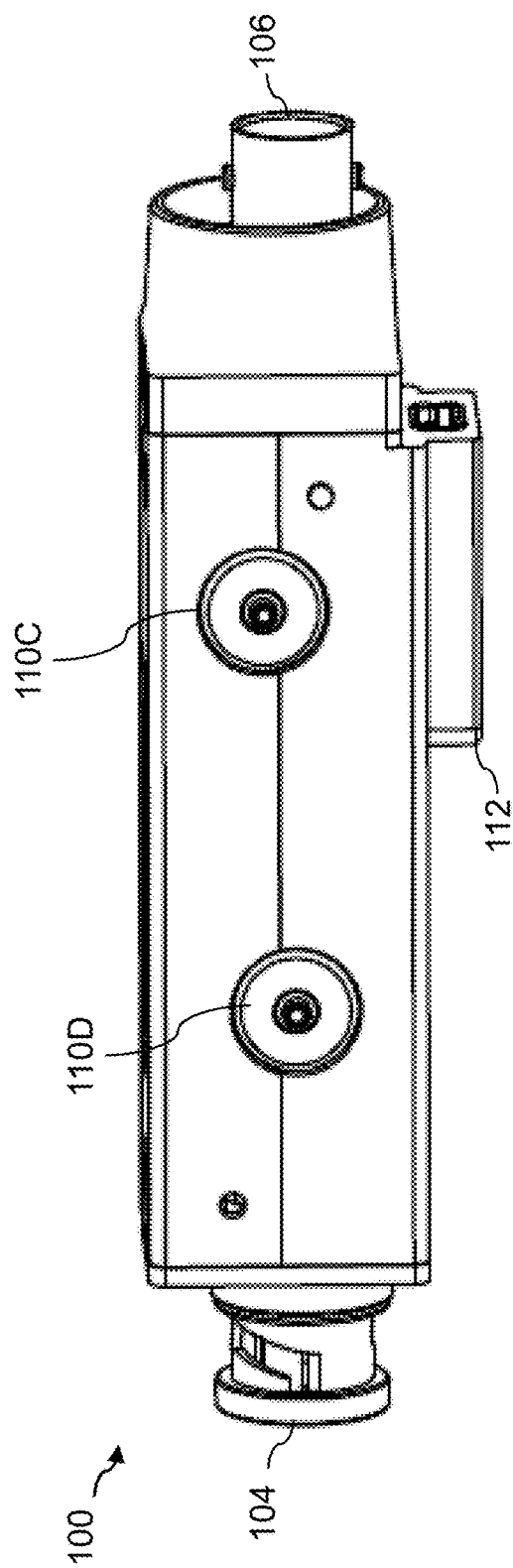

The housing 102 of the module 100 has first and second ends and multiple sides between the first and second ends. The electrical connector 104 is arranged at one of the ends of the housing 102 and the fiber optic connector 106 is arranged at the other end of the housing 102. One or more sets of interconnects 110 are arranged on respective ones of the sides of the housing 102. In the perspective view of FIG. 1, one set of interconnects 110 is visible, including interconnects 110A and 110B. A complementary set of interconnects is arranged on an opposite side of the housing 102, and includes interconnects 110C and 110D shown in FIG. 5.

The module 100 is an example of a stackable transmitter/receiver module and is illustratively configured for mated stacking with one or more additional stackable transmitter/receiver modules via the one or more sets of interconnects 110. For example, a given one of the one or more sets of interconnects 110 of the module 100 is configured to mate with a corresponding complementary set of interconnects arranged on a side of a housing of one of the additional stackable transmitter/receiver modules when the module 100 and the additional stackable transmitter/receiver module are disposed in a stacking relationship relative to one another.

Additional views showing respective ones of four different sides of the module 100 can be seen in FIGS. 2, 3, 4 and 5.

Figure 7:
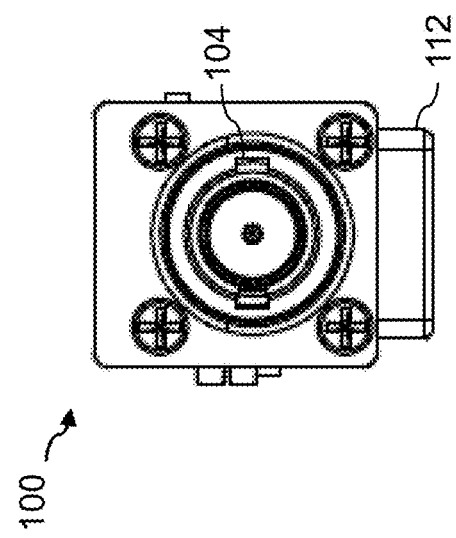
FIGS. 6 and 7 show respective end views of the fiber optic transmitter/receiver module of FIG. 1.
Figure 6:
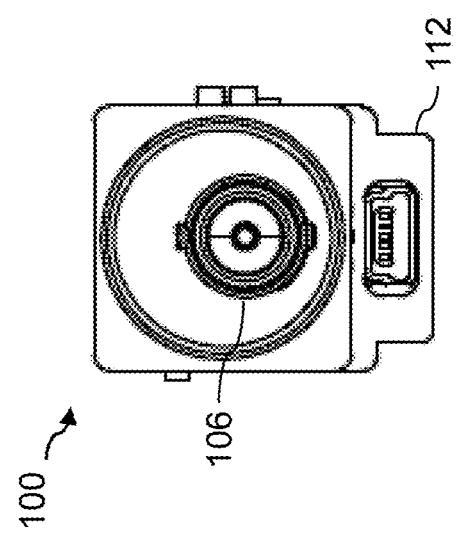

End views of the fiber optic transmitter/receiver module 100 illustrating the fiber optic connector 106 and the electrical connector 104 can be seen in FIGS. 6 and 7, respectively.

In this embodiment, the electrical connector 104 is a BNC connector, and the fiber optic connector is an ST fiber connector, although it is to be appreciated that other types of connectors can be used in other embodiments.

The display 108 is illustratively configured to present information relating to the health and status of the module 100. For example, the display 108 can present information such as optical power level, data rate and temperature. The display may be implemented as an organic light-emitting diode (OLED) display in which both text and graphics can be presented. In such an arrangement, the OLED display may be used to display signal type, transmit status and/or receive power. Other types of displays can be used in other embodiments.

The module 100 also includes a pair of magnetic interconnects 110A and 110B on one side of the module. These interconnects are also seen in the side view of FIG. 4. A similar but complementary pair of magnetic interconnects 110C and 110D is present on an opposite side of the module 100, as can be seen in the side view of FIG. 5 and in the stacking arrangement views of FIGS. 8 and 9. For example, the magnetic interconnects on one side of the module 100 are illustratively male, while those on the other side are illustratively female. The magnetic interconnects on a given side of the module 100 are configured to engage with the complementary magnetic interconnects on the side of another instance of the module when the multiple modules are stacked with one another.

Each of the sides of the module 100 that includes magnetic interconnects in this embodiment also includes a guide pin 115 and a guide hole 116, also configured to engage with complementary elements on other instances of the module when the multiple modules are stacked with one another. The complementary magnets and the set of guide pins and guide holes are illustratively offset from one another as shown in the figures. More particularly, these elements are located in different planes in order to provide improved cohesion between interconnected modules.

In an arrangement of this type, each of the modules 100 has power contacts of a first type on one of its sides and power contacts of another type on the other of its sides. The first type of power contacts of a first module are configured to link together with the second type of power contacts of a second module in order to provide power from the first module to the second module in a stacked arrangement of modules. As noted above, the power contacts are associated with the magnetic interconnects 110, each of which includes a magnet configured such that when the magnet of a given magnetic interconnect of the first module is brought close to the complementary magnet of the complementary magnetic interconnect of the second module, the magnetic attraction between the complementary magnets will serve to attract the modules to one another and hold the modules together. This type of magnetic interlocking arrangement serves to hold the interconnected modules securely together, while also facilitating distribution of power between the interconnected modules.

Other types of magnetic interconnects can be used in other embodiments. Examples of stacking arrangements in other embodiments are shown in FIGS. 8 and 9. Also, various types of positive lock structures can be used in addition to or in place of the magnetic interconnects in other embodiments. For example, mechanical interlock mechanisms can be provided in place of or in addition to the magnetic interconnects.

Although not illustrated in the figure, transmitter and/or receiver circuitry is incorporated within the module 100. For example, illustrative embodiments include fiber optic transmitter/receiver circuitry configured to transmit or receive standard definition (SD), high definition (HD) or high definition serial digital interface (HD-SDI) video signals, as well as associated embedded audio signals, over single-mode fiber. One or more such embodiments can advantageously distribute 3 Gbps (3G) HD-SDI 1080/60p signals over distances of up to 3 miles, and can be adapted in a straightforward manner for use with numerous other signal formats. These embodiments facilitate the conversion from copper-based electrical signals to optical signals transmitted over fiber.

Accordingly, illustrative embodiments are configured to support SD, HD and HD-SDI signal conversion functionality, although a wide variety of other types of signals can be transmitted or received in other embodiments, using other signal formats. Signals having other data rates can therefore be supported in other embodiments. For example, some embodiments can be configured to support data rates of 12 Gbps or higher.

As noted above, the fiber optic transmitter/receiver module 100 can be configured as a fiber optic transmitter or as a fiber optic receiver.

When configured as a fiber optic transmitter, the module 100 is operative to convert electrical signals received on electrical connector 104 to optical signals for transmission over optical fiber connected to the fiber optic connector 106.

When configured as a fiber optic receiver, the module 100 is operative to convert optical signals received from optical fiber connected to the fiber optic connector 106 to electrical signals for transmission over electrical cable connected to the electrical connector 104.

In other embodiments, it is possible to combine both fiber optic transmission and reception functionality into a single module having a stackable structural configuration similar to that of the module 100. The term "fiber optic transmitter/receiver" as used herein is therefore intended to be broadly construed so as to encompass a fiber optic transmitter, a fiber optic receiver or a fiber optic transceiver comprising both a fiber optic transmitter and a fiber optic receiver. The type of signals transmitted and/or received in a given embodiment may include but are not limited to video, audio and/or data.

Similarly, the term "transmitter/receiver module" as used herein is intended to be broadly construed so as to encompass a module comprising at least one of a transmitter and a receiver. The symbolic notation "/" in this and other related terminology herein is therefore intended to be construed as "and/or."

The particular type of transmitter/receiver circuitry implemented within the module 100 will vary depending upon the particular desired input-output signal configuration of the module, but in some embodiments will include one or more transceiver circuits as well as associated processor and memory components. The processor may comprise, for example, a microprocessor, a microcontroller, an application-specific integrated circuit (ASIC), a field-programmable gate array (FPGA) or other type of processing circuitry, as well as portions or combinations of such circuitry elements. The memory may comprise, for example, random access memory (RAM), read-only memory (ROM) or other types of memory, in any combination. The memory can be used for storing executable program code of one or more software programs utilized in operation of the module 100. These and other types of internal circuitry can be used, for example, to control signal conversion functionality of the module 100, and/or to implement one or more drivers for the display 108.

The module 100 further comprises a power supply inlet 112 operative to receive DC electrical power to energize the internal circuitry of module 100. In one embodiment, power supply inlet 112 may be a micro-USB standard connector associated with an external power supply, although other types of connectors may also be used in other embodiments. In some embodiments, the DC supply provided to module 100 via supply inlet 112 may be, for example, in the range of about 5V to 16V, with the actual value used in a given embodiment depending upon the design of the internal circuitry of the module.

As noted above, multiple instances of the modules 100 may be linked together via the magnetic interconnects 110. As each of the modules has a power supply inlet, only one module in the group needs to be powered, with that module passing power to the others via power contacts associated with the magnetic interconnects on each module. In the FIG. 1 embodiment, central contacts of the magnetic interconnects 110 are operative to pass power from one module to the next module in a group of multiple stacked modules. Should more power or power redundancy be desired, additional power supplies can be plugged into the power supply inlets of other modules in the group of stacked modules.

With reference now to FIG. 8, an embodiment is shown in which a plurality of fiber optic transmitter/receiver modules 100-1, 100-2 and 100-3 are arranged for interconnection with one another via their respective sets of complementary magnetic interconnects. It should be noted that in this embodiment, the modules are similar but not identical to the module 100 described in conjunction with the FIG. 1 embodiment. The multiple modules when interconnected and stacked via their respective complementary magnetic interconnects are linked together to form a cohesive unit of stacked modules. More particularly, the modules are linked together by bringing adjacent modules in proximity to one another such that the magnets proximate to the power contacts form a cohesive bond with each other, thereby enabling contact of the power contacts between the adjacent modules.

Any desired combination of different fiber optic transmitters or receivers can be stacked in this manner. For example, a given stack of interconnected modules can comprise all transmitters, all receivers, or a mixture of transmitters and receivers. As mentioned previously, other module configurations are possible, such as transceiver modules, and those modules can be configured for stacked interconnection in a similar manner. Power need only be supplied to a single one of the modules, via a power supply connected to its corresponding power supply inlet or possibly via a battery pack as described elsewhere herein. Power supplied to a first module by a power supply or battery pack is distributed to the other modules via the power contacts of each module. However, it should be noted that power may be supplied to more than one of the modules if additional power is desired.

FIG. 9 illustrates the manner in which the multiple modules 100-1, 100-2 and 100-3 of FIG. 8 can be interfaced with a battery pack 900. In this embodiment, the battery pack 900 has male magnetic interconnects on one side, and mates with the female magnetic interconnects on a facing side of one of the stacked modules as shown. The battery pack 900 will supply power to the fiber optic transmitter/receiver module it is in contact with as well as all of the other modules connected in the stack. More particularly, power provided by a battery installed in the battery pack 900 is distributed to all of the modules in the stack of modules via the power contacts of their respective magnetic interconnects.

The battery within the battery pack 900 may be readily-available inexpensive battery such as a standard 9V battery. The battery pack 900 arrangement illustrated in FIG. 9 is useful in field applications or other applications in which power supply connections are not available. For example, the battery pack 900 is illustratively configured as a mounting clip to attach a 9V battery to a given stack of interconnected modules, allowing their use in remote areas for up to eight hours where local power is not available. The battery pack 900 is an example of what is more generally referred to herein as a "power pack."

Again, other arrangements of interconnects can be used to stack the modules and battery pack in other embodiments.

Also, other types of power supply arrangements can be used. For example, some embodiments are configured with a power clip that provides the module with power via the DC power output on a camera. Conventional camera mounted fiber transport systems can add undue amounts of additional weight to the camera, thereby throwing off the center of gravity for a cameraman, and making the camera difficult to operate. The power clip arrangement in some embodiments provides a small and lightweight 3G HD-SDI fiber transport solution powered by the camera.

In the illustrative embodiments described above in conjunction with FIGS. 1 through 9, multiple fiber optic transmitter/receiver modules can be effectively locked together via the complementary magnetic interconnects on facing sides of adjacent modules. As indicated previously, power passes through one module to the next so there is just one power supply needed for all of the modules in the stack. In some embodiments, the interlocking mechanism for the modules is the magnetic interconnects, which also include respective power contacts, although other interconnection mechanisms and associated power contacts can be used to interlock the stacked modules.

These embodiments can be advantageously configured to convert video signals quickly and very economically for transport over optical fiber. Such embodiments are well suited for use in a wide variety of different live production settings and other types of video installations.

Users can interconnect any desired arrangement of transmitter or receiver modules with just a single power supply in order to construct a customized fiber optic unit in an efficient manner and at low cost. The disclosed arrangements allow multiple modules to interlock with one another via magnetic interconnects so as to share power while allowing users to reconfigure signal flow directions in seconds. As a result, for example, users can literally carry around the transmitter and receiver modules in their pockets. A given user can then attach a transmitter module to an SDI cable or an SDI out connector on a piece of production equipment and send fiber optic signals up to 3 miles over a single-mode fiber cable.

It should be noted that the module interconnection and power distribution features described herein can be applied to other types of modules such as, for example, distribution amplifiers, digital signal re-clockers and signal conversion devices. One or more such devices can be combined with a fiber optic transmitter or receiver to form another type of stackable module in other embodiments. For example, each transmitter and receiver in a given embodiment may be configured to include a built-in re-clocker and a push-button re-clocker on/off switch. Numerous other module configurations are possible.

As indicated previously, embodiments of the invention can be utilized in implementing fiber optic signal transport functionality in a wide variety of video and fiber optic system applications. For example, embodiments are well suited for a wide variety of professional audio-video and broadcast applications, including video production and editing, sports teleproduction, field production, remote camera links and cross-campus production.

It is to be appreciated that the fiber optic transmitter/receiver module configurations described above are presented by way of example only. Numerous alternative embodiments can be configured using additional or alternative components in other configurations. Accordingly, although illustrative embodiments of fiber optic transmitter/receiver modules have been described with reference to FIGS. 1 through 9, it is to be understood that fiber optic transmitter/receiver modules in accordance with the invention are not limited to those precise embodiments, and that various other changes and modifications may be effected by one skilled in the art without departing from the scope or spirit of the invention.

Figure 10:
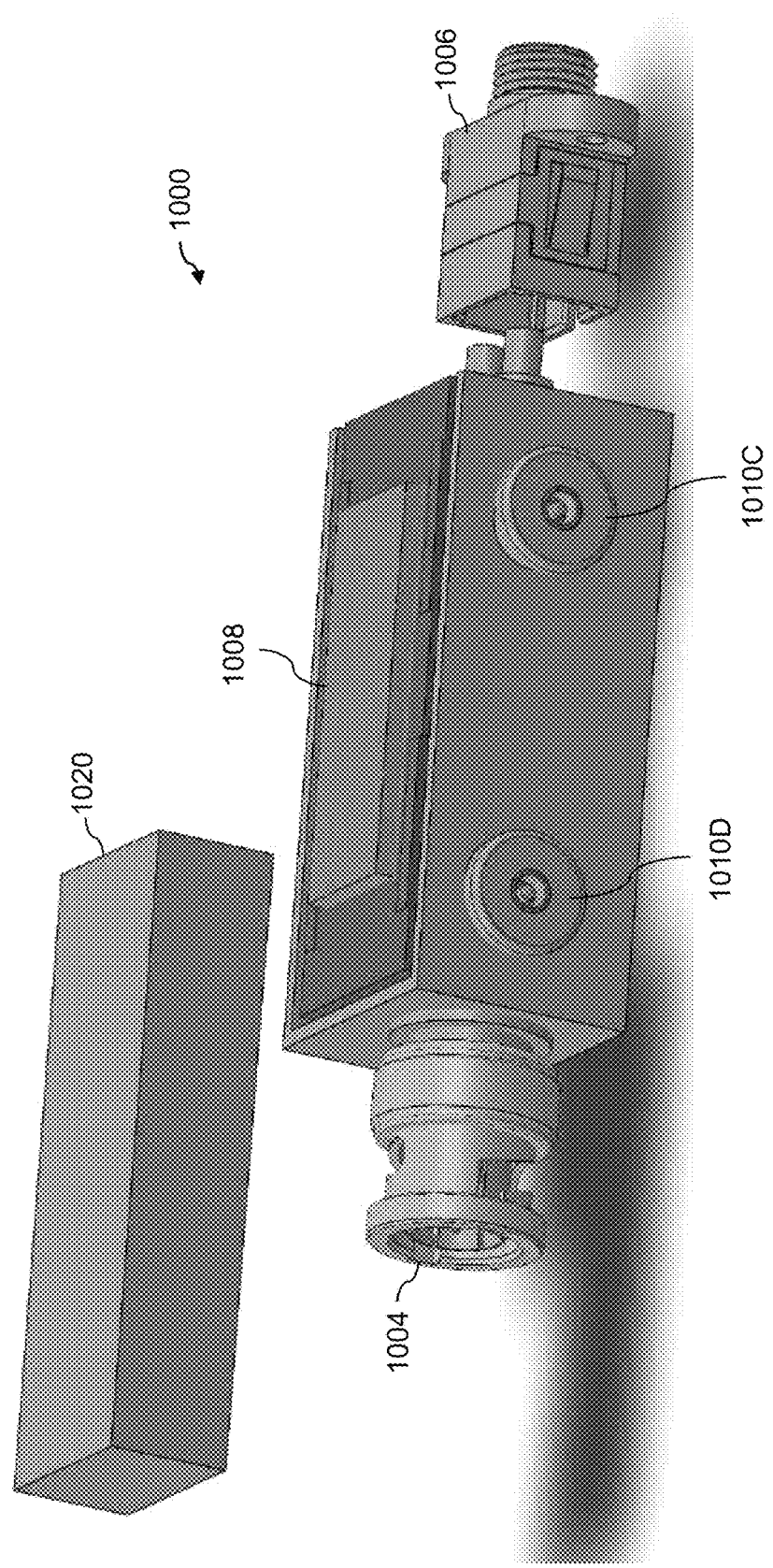
FIGS. 10, 11 and 12 show exploded views of transmitter/receiver modules in other illustrative embodiments.
Figure 11:
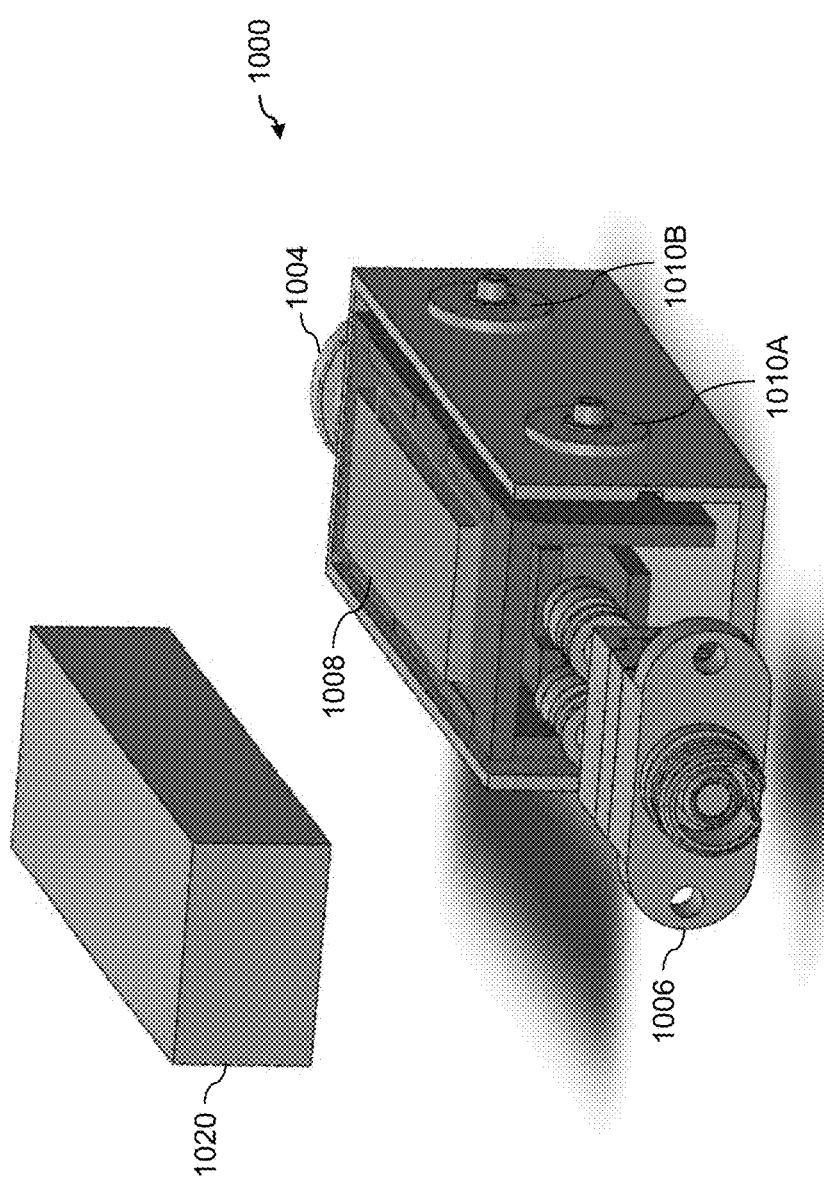
Figure 12:
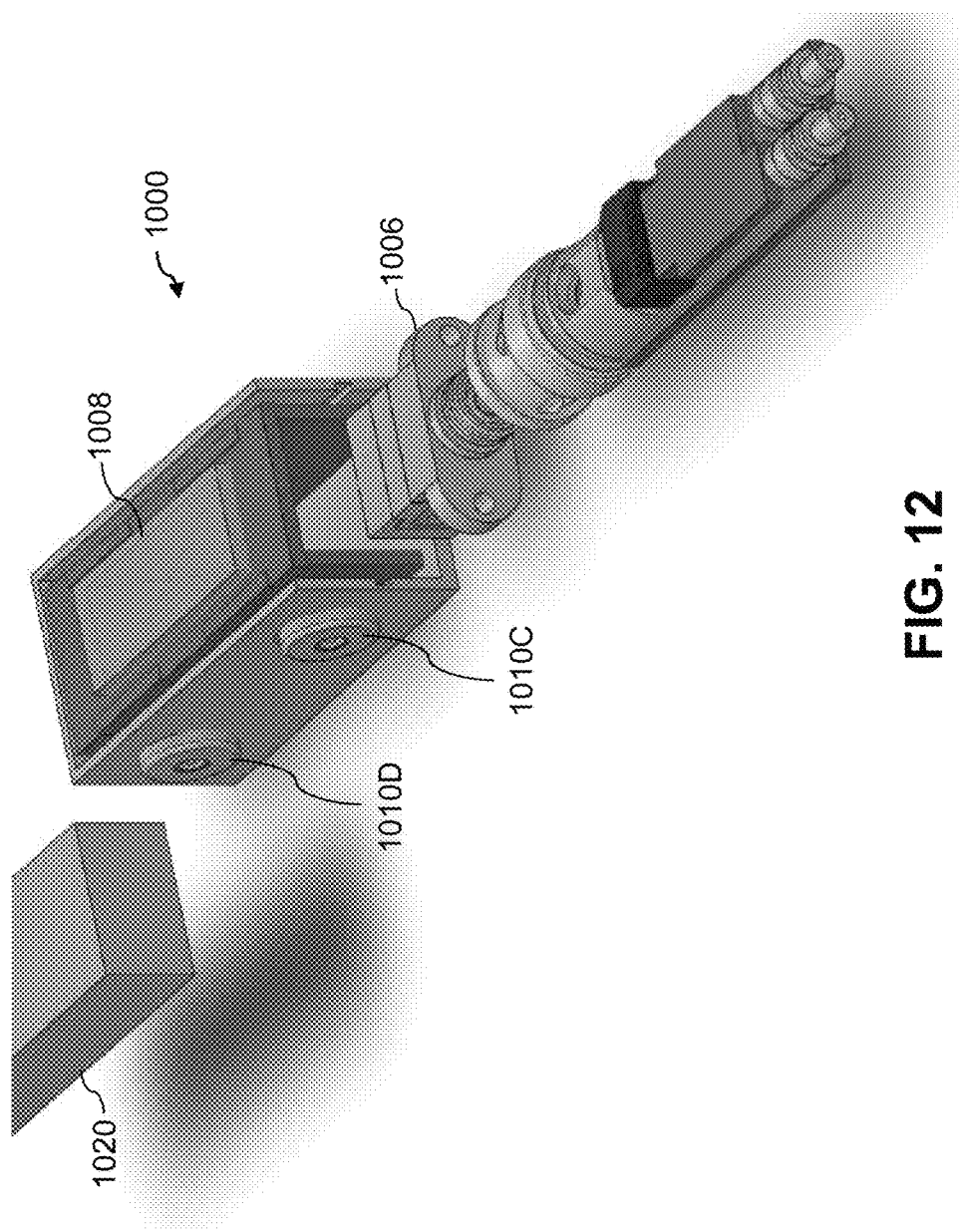

By way of example, additional illustrative embodiments are shown in FIGS. 10, 11 and 12. In these exploded views, a fiber optic transmitter/receiver module 1000 is configured to provide stackable interconnection and inter-module power distribution features similar to those previously described in conjunction with FIGS. 1 through 9. In these views, the modules are shown as having a housing cover 1020 which is illustratively removed for clarity of illustration.

With reference to FIG. 10, the fiber optic transmitter/receiver module 1000 as shown comprises an electrical connector 1004 and a fiber optic connector 1006. The fiber optic connector 1006 is suitable for attachment to other connector components as illustrated, for example, in the FIG. 12 arrangement. A wide variety of other types of connector arrangements can be used, depending upon the needs of the particular application. The module 1000 further comprises a display 1008 which is illustratively concealed by the cover 1020 when the cover 1020 is installed.

Also included in the module 1000 are first and second sets of magnetic interconnects 1010 arranged on respective first and second sides of the module housing. In the view of FIG. 10, a set of magnetic interconnects 1010 including magnetic interconnects 1010C and 1010D on one side of the module housing is visible, while a complementary set of magnetic interconnects more particularly including magnetic interconnects 1010A and 1010B on an opposite side of the module housing are visible in the view of FIG. 11.

Another illustrative embodiment is shown in FIGS. 13, 14, 15, 16 and 17. This embodiment is similar to the embodiment illustrated in FIGS. 1 through 7, but the transmitter/receiver module 100' as shown in FIGS. 13 through 17 includes an HD-SDI input connector 104' and a Society of Motion Picture and Television Engineers (SMPTE) 2022-6 Internet Protocol (IP) video output comprising an RJ45 connector 106'. The module 100' also comprises a display 108' and one or more sets of magnetic interconnects including a set of interconnects 110A' and 110B' on one side of a housing of the module 100'. A complementary set of magnetic interconnects is illustratively arranged on an opposite side of the module housing. FIG. 13 shows a perspective view of the transmitter/receiver module 100', and FIGS. 14, 15, 16 and 17 show respective top, side, front end and back end views of the transmitter/receiver module 100'.

Multiple instances of the FIG. 13 transmitter/receiver module 100' can be stacked with one another via their respective sets of complementary magnetic interconnects, in a manner similar to that previously described in conjunction with FIG. 8. Also, such multiple stacked modules can be interfaced with a battery pack in a manner similar to that illustrated in FIG. 9. It is to be appreciated, however, that alternative embodiments need not be configured to provide stackable interconnection of multiple modules.

Other variants of the FIG. 13 embodiment are possible. For example, other types of SD or HD video signal input configurations could be used. The BNC connector utilized for the HD-SDI input in this embodiment can therefore be replaced with another type of connector in other embodiments. Additionally or alternatively, the IP video output could comprise an optical fiber connector rather than an RJ45 connector.

As another possible variant, a transmitter/receiver module of the type shown in FIGS. 13 through 17 can be modified to include at least one additional or alternative port, so as to support, for example, input and output IP video as well as an HDMI or other type of video signal input or output, where HDMI denotes "high definition multimedia interface." The input and output IP video can utilize optical fiber connections, RJ45 connections or other types of connections.

Although not explicitly illustrated in FIGS. 13 through 17, a power supply inlet similar to that shown in the FIG. 1 embodiment may be included in the FIG. 13 embodiment or in a variant of such an embodiment. Such a power supply inlet is illustratively configured to receive DC electrical power to energize internal circuitry of the module, assuming the presence of internal circuitry configured to operate using an external power supply, and may comprise a micro-USB standard connector or other type of connector. In other embodiments, power can supplied to the module via input or output connectors, via an internal power supply, or using combinations or variants of these or other techniques.

It should therefore again be emphasized that the above-described embodiments of the invention are presented for purposes of illustration only. Many variations and other alternative embodiments may be used. For example, the disclosed techniques are applicable to a wide variety of other types and arrangements of modules and associated fiber optic systems. Also, the particular configurations of fiber optic module and system elements mentioned herein can be varied in other embodiments. Thus, for example, the particular types and arrangements of housings, internal circuitry, connectors, interconnects, displays, power sources, signals, signal formats and other components and features deployed in a given embodiment and their respective configurations may be varied. Also, as indicated previously, alternative embodiments of transmitter/receiver modules as disclosed herein can include various input and/or output configurations that do not necessarily involve fiber optics. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a first stackable transmitter/receiver module;
   the first stackable transmitter/receiver module comprising:
      a housing having first and second ends and multiple sides between the first and second ends;
      a first signal connector arranged at the first end of the housing;
      a second signal connector arranged at the second end of the housing; and
      one or more sets of interconnects arranged on respective ones of the sides of the housing;
   wherein the first stackable transmitter/receiver module is configured for mated stacking with one or more additional stackable transmitter/receiver modules via said one or more sets of interconnects;
   wherein a given one of the one or more sets of interconnects of the first transmitter/receiver module is configured to mate with a corresponding complementary set of interconnects arranged on a side of a housing of one of the additional stackable transmitter/receiver modules when the first and additional stackable transmitter/receiver modules are disposed in a stacking relationship relative to one another;
   wherein the given set of interconnects arranged on one of the sides of the housing of the first stackable transmitter/receiver module comprises power contacts of a first type configured to electrically connect with respective complementary power contacts of a second type in a complementary set of interconnects on a side of a housing of one of the additional stackable transmitter/receiver modules; and
   wherein one of the first and additional stackable transmitter/receiver modules is configured to supply electrical power to another of the first and additional stackable transmitter/receiver modules via the power contacts of the first and second types when the first and additional stackable transmitter/receiver modules are disposed in a stacking relationship relative to one another.

2. The apparatus of claim 1 wherein the first stackable transmitter/receiver module comprises a first stackable fiber optic transmitter/receiver module.

3. The apparatus of claim 1 wherein one of the first and second signal connectors comprises an electrical connector and the other of the first and second signal connectors comprises a fiber optic connector.

4. The apparatus of claim 3 wherein the electrical connector comprises a BNC connector and the fiber optic connector comprises an ST fiber connector.

5. The apparatus of claim 1 wherein the first stackable transmitter/receiver module comprises first and second sets of interconnects arranged on respective opposing first and second ones of the multiple sides and further wherein the first set of interconnects arranged on the first side is complementary to the second set of interconnects arranged on the second side.

6. The apparatus of claim 1 wherein the housing has a rectangular shape with first, second, third and fourth sides between the first and second ends.

7. The apparatus of claim 1 wherein the first stackable transmitter/receiver module further comprises a display arranged on one of the multiple sides other than a side on which a set of interconnects is arranged.

8. The apparatus of claim 7 wherein the display comprises an OLED display.

9. The apparatus of claim 7 wherein the display is configured to present information specifying at least one of signal power level, signal type, signal data rate and signal status for at least one signal transmitted or received by the first stackable transmitter/receiver module via a corresponding one of the first and second signal connectors.

10. The apparatus of claim 1 wherein the first stackable transmitter/receiver module further comprises a power supply inlet arranged on one of the multiple sides other than a side on which a set of interconnects is arranged.

11. The apparatus of claim 1 wherein the given set of interconnects arranged on one of the sides of the housing of the first stackable transmitter/receiver module comprises a set of magnetic interconnects configured to magnetically engage with a complementary set of magnetic interconnects on a side of a housing of one of the additional stackable transmitter/receiver modules.

12. The apparatus of claim 1 wherein the given set of interconnects arranged on one of the sides of the housing of the first stackable transmitter/receiver module comprises a set of mechanical interlock components configured to engage with a complementary set of mechanical interlock components on a side of a housing of one of the additional stackable transmitter/receiver modules.

13. The apparatus of claim 1 further comprising a power pack having one or more sets of interconnects arranged on respective sides of a housing of the power pack and wherein a given one of the one or more sets of interconnects of the power pack is configured to mate with a corresponding complementary set of interconnects of one of the first and additional stackable transmitter receiver/modules.

14. The apparatus of claim 13 wherein electrical power is supplied from the power pack to one of the first and additional stackable transmitter/receiver modules and from that stackable transmitter/receiver module to another one of the stackable transmitter/receiver modules through their respective sets of interconnects.

15. The apparatus of claim 1 wherein the first stackable transmitter/receiver module further comprises:
a built-in re-clocker; and
a re-clocker switch configured to control an operational state of the built-in re-clocker.

16. The apparatus of claim 1 wherein one of the first and second signal connectors comprises an HD-SDI input connector and the other of the first and second signal connectors comprises an RJ45 output connector providing an SMPTE 2022-6 IP video output.

17. The apparatus of claim 1 wherein at least one interconnect of the given set of interconnects comprises a magnetic interconnect having an outer circular portion that substantially surrounds a central electrical conductor, wherein the central electrical conductor is configured to establish a mating connection with a corresponding complementary central electrical conductor of another magnetic interconnect of the complementary set of interconnects of the additional stackable transmitter/receiver module.

18. The apparatus of claim 1 wherein at least one interconnect of the given set of interconnects on one of the sides of the housing of the first stackable transmitter/receiver module is electrically connected to a corresponding interconnect of another set of interconnects on an opposite side of the housing of the first stackable transmitter/receiver module.

19. A method comprising:
obtaining a plurality of stackable transmitter/receiver modules, each of the stackable transmitter/receiver modules comprising:
a housing having first and second ends and multiple sides between the first and second ends;
a first signal connector arranged at the first end of the housing;
a second signal connector arranged at the second end of the housing; and
one or more sets of interconnects arranged on respective ones of the sides of the housing;
the plurality of stackable transmitter/receiver modules being configured for mated stacking with one another via their respective one or more sets of interconnects; and
disposing first and second ones of the plurality of stackable transmitter/receiver modules in a stacking relationship with one another in which a given one of the one or more sets of interconnects of the first stackable transmitter/receiver module mates with a corresponding complementary set of interconnects of the second stackable transmitter/receiver module;
wherein the given set of interconnects of the first stackable transmitter/receiver module comprises power contacts of a first type configured to electrically connect with respective complementary power contacts of a second type in the complementary set of interconnects of the second stackable transmitter/receiver module; and
wherein one of the first and second stackable transmitter/receiver modules is configured to supply electrical power to another of the first and second stackable transmitter/receiver modules via the power contacts of the first and second types when the first and second stackable transmitter/receiver modules are disposed in a stacking relationship relative to one another.

20. A fiber optic transport system comprising:
a plurality of stackable transmitter/receiver modules, each of the stackable transmitter/receiver modules comprising:
a housing having first and second ends and multiple sides between the first and second ends;
a first signal connector arranged at the first end of the housing;
a second signal connector arranged at the second end of the housing; and
one or more sets of interconnects arranged on respective ones of the sides of the housing;
the plurality of stackable transmitter/receiver modules being configured for mated stacking with one another via their respective one or more sets of interconnects;
wherein first and second ones of the plurality of stackable transmitter/receiver modules are disposed in a stacking relationship with one another in which a given one of the one or more sets of interconnects of the first stackable transmitter/receiver module mates with a corresponding complementary set of interconnects of the second stackable transmitter/receiver module;
wherein the given set of interconnects of the first stackable transmitter/receiver module comprises power contacts of a first type configured to electrically connect with respective complementary power contacts of a second type in the complementary set of interconnects of the second stackable transmitter/receiver module; and
wherein one of the first and second stackable transmitter/receiver modules is configured to supply electrical power to another of the first and second stackable transmitter/receiver modules via the power contacts of the first and second types.

* * * * *